United States Patent
Sennewald et al.

[15] 3,692,829
[45] Sept. 19, 1972

[54] PROCESS FOR ISOLATING ACRYLIC ACID FROM AQUEOUS CRUDE ACRYLIC ACID BY EXTRACTION WITH A KETONE AND PLURAL STAGE DISTILLATION

[72] Inventors: Kurt Sennewald, Hermulheim near Cologne; Heinz Erpenbach, Surth near Cologne; Heinz Handte, Cologne; Winfried Lork, Friesheim, all of Germany

[73] Assignee: Knapsack Aktiengesellschaft, Knapsack near Cologne, Germany

[22] Filed: Dec. 15, 1970

[21] Appl. No.: 98,336

[30] Foreign Application Priority Data

Dec. 27, 1969 Germany..........P 19 65 014.7

[52] U.S. Cl..................260/526 N, 203/15, 203/43, 203/62, 203/78
[51] Int. Cl.........................C07c 57/04, C07c 51/48
[58] Field of Search............203/15, 43, 62, 78, 84, 1; 260/526 N

[56] References Cited

UNITED STATES PATENTS

| | | | |
|---|---|---|---|
| 2,526,508 | 10/1950 | Scheeline et al. | 203/15 |
| 3,344,178 | 9/1967 | Brown et al. | 203/15 |
| 3,433,831 | 3/1969 | Yomyami et al. | 203/15 |
| 3,553,261 | 1/1971 | Sennevald et al. | 260/526 N |

FOREIGN PATENTS OR APPLICATIONS

| | | |
|---|---|---|
| 997,324 | 7/1965 | Great Britain.........260/526 N |
| 997,325 | 7/1965 | Great Britain.........260/526 N |
| 1,167,487 | 10/1969 | Great Britain.........260/526 N |

*Primary Examiner*—Wilbur L. Bascomb, Jr.
*Attorney*—Connolly and Hutz

[57] ABSTRACT

Pure acrylic acid is isolated from an aqueous crude acid containing acrylic acid together with minor proportions of acetic acid, formaldehyde and high boilers boiling at a temperature higher than 220°C by liquid-liquid extraction with the use of 3,3,5-trimethyl-cyclohexanone and/or isophorone as the extractant(s). To this end, the aqueous acrylic acid-containing crude acid is subjected in an extraction zone to counterflow extraction with the use of the extractant(s) and with the resultant formation of an organic extract containing acrylic acid, acetic acid, high boilers and minor proportions of water, which are dissolved in the extractant; the extract is introduced approximately into the midsection of a first distilling column; acetic acid and water are removed overhead under reduced pressure; the base product of the first distilling column, containing extractant(s), acrylic acid and high boilers, is delivered approximately to the midsection of a second distilling column; pure acrylic acid is distilled off overhead under reduced pressure; and the base product of the second distilling column, consisting of high boilers and extractant(s), is recycled to the extraction zone.

6 Claims, 1 Drawing Figure

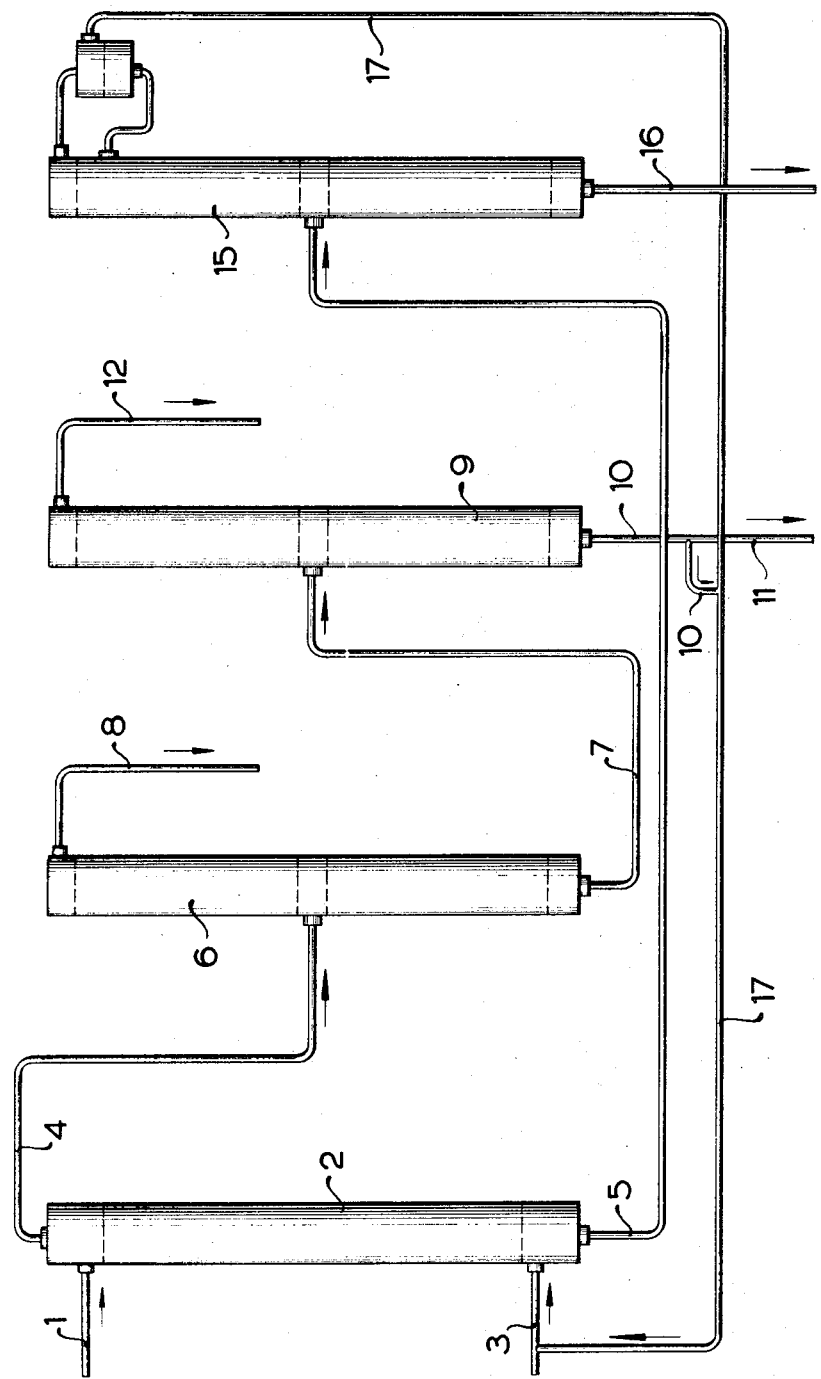

PROCESS FOR ISOLATING ACRYLIC ACID FROM AQUEOUS CRUDE ACRYLIC ACID BY EXTRACTION WITH A KETONE AND PLURAL STAGE DISTILLATION

The present invention relates to a process for isolating pure acrylic acid from an aqueous crude acid containing acrylic acid together with minor proportions of acetic acid, formaldehyde and high boilers boiling at a temperature higher than 220° C, by liquid-liquid extraction with the use of 3,3,5-trimethylcyclohexanone and/or isophorone as the extractant.

French Pat. of addition No. 86,090 (British Pat. No. 997 324) describes a process, wherein acrylic acid is extracted from an aqueous solution having minor proportions of acetic acid therein, with the use of ethyl acrylate or ethyl acetate as the extractant. The resulting organic extract is distilled and — when ethyl acetate is the extractant — an azeotropic mixture of ethyl acetate and water is obtained near the head of the column. The column base product is a mixture consisting of 80 weight percent of acrylic acid and 20 weight percent of acetic acid. The mixture is distilled once again and extensively purified acrylic acid having a strength of 98.6 percent is obtained as the column base product, in a yield of 75 percent of the theoretical. In view of the high concentration of acrylic acid in the distillate, which is composed of 50.6 weight percent of acrylic acid and 49.4 weight percent of acetic acid, it is necessary for the distillate to be purified once again, which does not add to the economy of this process. A further disadvantage of this process resides in the high expenditure of energy that is occasioned by the need to distil the total quantity of extractant used, in view of its boiling point which is lower than that of acrylic acid.

A further process has been described in French Pat. No. 1 405 764, wherein pure acrylic acid is isolated from an aqueous crude acid by extracting it preferably with the use of diisopropylether or isopropyl acetate as the extractant and simultaneously washing the extract with water flowing countercurrently thereto. Subjecting the extract to finishing treatment results in the formation of a concentrate containing 97.8 weight percent of acrylic acid and 2.2 weight percent of acetic acid. This concentration of acetic acid in the acrylic acid concentrate indicates that merely about 60 weight percent of the acetic acid initially present in the crude acid is removed by this conventional purification. Acrylic acid having about 2 weight percent of acetic acid therein is, however, unsuitable for use in either the manufacture of acrylic acid esters, or polymerization reactions. In other words, this process fails to satisfy common technical standard requirements.

Further processes have been described in British Pats. No. 997 325 and No. 1 167 487, wherein pure acrylic acid is isolated from an aqueous crude acid containing acrylic acid together with minor proportions of acetic acid and possibly formaldehyde by extracting the acid with ethyl acetate and simultaneously washing the resulting organic extract with water. Following this, the washed extract is distilled to isolate firstly pure acrylic acid and secondly a low-boiling azeotrope consisting of ethyl acetate and water. Once again, however, it is necessary in these processes to subject the total quantity of extractant to distillation with heavy expenditure of energy.

A process similar to that reported in British Pat. No. 1 167 487 has been described in earlier German Patent application No. P 18 05 758. 4, save that the aqueous crude acid having acrylic acid therein is extracted with the use of 3,3,5-trimethylcyclohexanone or isophorone as a high boiling extractant. The resulting organic extract is washed with water flowing countercurrently thereto, and dehydrated in a first distilling stage. The base product of the first distilling stage is delivered to a second distilling stage and pure acrylic acid is distilled off therein.

The present invention now provides a process which combines a beneficial effect of the process reported in French Pat. of addition No. 86 090, namely the omission of the counterflow water wash near the head of the extraction column, with the beneficial effect of the process described in earlier German Pat. application No. P 18 05 758. 4, namely the use of the high-boiling extractant. The quantity of water supplied heretofore to the head of the extraction column substantially corresponded — this in view of the distribution coefficient — to the quantity of water already present in a 25 weight percent solution of crude acrylic acid, for example. In other words, 6000 metric tons rather than 3000 metric tons of waste water are obtained for a monthly production of 1000 metric tons of acrylic acid, for example.

The process of the present invention for isolating pure acrylic acid from an aqueous crude acid containing acrylic acid together with minor proportions of acetic acid, formaldehyde and high boilers boiling at a temperature higher than 220° C by liquid-liquid extraction with the use of 3,3,5-trimethylcyclohexanone and/or isophorone as the extractant(s), comprises more particularly subjecting the aqueous acrylic acid-containing crude acid in an extraction zone to counterflow extraction with the use of the extractant(s) and with the resultant formation of an organic extract containing acrylic acid, acetic acid, high boilers and minor proportions of water, which are dissolved in the extractant; introducing the extract approximately into the midsection of a first distilling column; removing acetic acid and water overhead under reduced pressure; delivering the base product of the first distilling column, containing extractant(s), acrylic acid and high boilers, approximately to the midsection of a second distilling column; distilling off pure acrylic acid overhead under reduced pressure; and recycling the base product of the second distilling column, consisting of high boilers and extractant(s), to the extraction zone.

Further preferred features of the present invention comprise:

a. removing from the second distilling column a portion of base product consisting of high boilers and extractant; distilling the said base product portion and merely recycling to the extraction zone extractant distillatively freed from the high boilers;

b. delivering aqueous raffinate, which is obtained in the extraction zone and contains dissolved extractant, approximately to the midsection of a stripping column; recovering extractant, by removing an azeotrope of extractant and water overhead; recycling the azeotrope to the extraction zone; and discharging waste water through the base of the stripping column;

c. operating the first and second distilling columns under a pressure of between 5 and 200 mm Hg;
d. using aqueous crude acid containing between 5 and 40 weight percent of acrylic acid, between 0.5 and 8 weight percent of acetic acid, between 0.5 and 5 weight percent of formaldehyde and between 0.2 and 5 weight percent of high boilers;
e. effecting the extraction of the aqueous crude acid with the use of between one and 10 parts by weight, preferably between two and four parts by weight of extractant, per part by weight of acrylic acid in the aqueous crude acid.

The following statements further illustrate the process of the present invention.

The condensate of crude acrylic acid to be transformed into pure acrylic acid generally originates from the catalytic gas phase-oxidation of propylene to acrylic acid, which has been described, for example, in German Pat. No. 1 241 817.

The proportion of acetic acid, which initially appears in the condensate of crude acrylic acid but passes into the extract of acrylic acid/isophorone and/or 3,3,5-trimethylcyclohexanone, during the liquid-liquid extraction of the acrylic acid, is not isolated by counter-flow extraction with water but is distillatively isolated from the said extract together with the water dissolved in the extract. It is thereby possible to considerably increase the throughput of material through the simplex extraction column. To effect separation of residual water dissolved in the extract of acrylic acid/extractant, it is necessary in accordance with the present invention to use a distilling column, wherein the extract is distillatively freed from residual water together with the acetic acid therein, and wherein the extractant has an additional beneficial effect on the separation firstly of water/acetic acid and secondly acrylic acid, in the sense of an extractive distillation. This additional separating effect is clearly reflected by the separating factor $\beta$, which is calculated on the basis is the distribution coefficients (K) for acrylic acid and acetic acid in the mixture of extractant/water, and found to be:

$$\beta = \frac{K_{\text{acrylic acid}}}{K_{\text{acetic acid}}} \approx 4$$

The wash-water needed heretofore for the re-extraction of acetic acid from the extract is economized in the process of the present invention. This means a 50 percent reduction of the costs of waste water disposal, for an acrylic acid production facility. Of prime importance is the fact that the waste water obtained in the present process contains so minor proportions of organic substances that costly biologic waste water-treatment is rendered unnecessary.

A further advantage of the present process resides in the fact that the bulk of acetic acid which is in the form of a 10 to 20 weight percent aqueous solution can be subjected to finishing treatment under commercially attractive conditions. The process of the present invention will now be described with reference to the accompanying flow scheme.

A condensate of crude acrylic acid originating from propylene oxidation is delivered through conduit 1 to the upper portion of a liquid-liquid pulsation and extraction column 2. The pulsating column is packed with stainless steel spirals and has an efficiency corresponding to that of eight theoretical trays. An extractant mixture of isophorone and 3,3,5-trimethylcyclohexanone is introduced into the base of column 2 through conduit 3 with the result that the acrylic acid and acetic acid go into the organic phase and travel upwardly jointly with the extractant. Water droplets which are carried along deposit in a calming zone near the head of the extraction column and drop back into the column base. The extract containing acrylic acid, acetic acid, water and high boilers, is pumped through conduit 4 to the expulsion zone of first distilling column 6. Thermally induced polymerization of acrylic acid is avoided by distillative isolation of water and acetic acid under reduced pressure, preferably under a pressure of between 10 and 200 mm Hg, corresponding to a head temperature of between 20 and 100° C. Column 6 may be a packed column or bubble tray column with between 10 and 20 theoretical trays in its expulsion zone, and the same number of trays in its reflux intensifier zone. For a minimum reflux ratio of 1.5, preferably between 2 and 4, it is possible to isolate water and acetic acid almost quantitatively. The distillate is discharged through conduit 8 and subjected to finishing treatment.

The base product containing acrylic acid, high boilers and extractant is delivered through conduit 7 to second distilling column 9, which may also be a packed column or bubble tray column. Column 9 is operated under reduced pressure of between 10 and 100 mm Hg and at a preferred reflux ratio of 3 : 1. Pure acrylic acid containing less than 0.1 weight percent of acetic acid, 0.2 weight percent of extractant and 0.1 weight percent of water, is discharged near the head of column 9 through conduit 12. The column base product is extractant, which is discharged through conduit 10 and repumped to extraction column 2, through conduits 17 and 3. Accumulation of high boilers is avoided by withdrawing a portion of the extractant mixture from the cycle, through conduit 11, freeing it from undistillable residues in a thin film evaporator (not shown in the drawing), and re-introducing it into the extractant cycle.

Water (raffinate) obtained in the bottom portion of extracting column 2 is delivered through conduit 5 to column 15 in which the extractant dissolved in the water is stripped off and recovered. Column 15 is operated at atmospheric pressure. The dissolved extractant is recovered azeotropically as upper phase near the head of the column and delivered through conduits 17 and 5 to extraction column 2, whereas the lower aqueous phase is returned to column 15. Waste water, which is free from extractant and contains merely minor proportions of organic substances (formaldehyde) is discharged at the bottom of column 15, through conduit 16.

The polymerization of acrylic acid during the distillation of the extract is avoided, preferably by adding a conventional stabilizer, such as hydroquinone, p-tert. butylpyrocatechol, p-benzoquinone or methylene blue. The acrylic acid is further stabilized by the addition of a corresponding stabilizer to the distillate and reflux matter coming from the overall columns.

The process described hereinabove distinguishes very favorably from those used heretofore for the production of pure acrylic acid. This in view of the fact that merely a simplex extraction column with high throughput rates is required to be used for the extraction of acrylic acid from the aqueous crude acid. The present process not only enables water and acetic acid to be isolated in a single column from acrylic acid and extractant, it also enables pure acetic acid to be produced under commercially attractive conditions. The considerably reduced formation of waste water and the fact that the waste water need not be subjected to biologic treatment are further commercially important factors in which the present process distinguishes so favorably over conventional and partially common processes.

EXAMPLE 865 kg of an aqueous condensate of crude acrylic acid composed of:
   30.0 weight percent of acrylic acid,
   2.0 weight percent of acetic acid,
   0.9 weight percent of formaldehyde,
   2.1 weight percent of high boilers (bp > 220°C),
   0.1 weight percent of hydroquinone,
the balance being water, was introduced into the upper portion of pulsating extraction column 2. The column had an effective height of 3 meters and was packed with stainless steel spirals (8 mm). 709 kg of an extractant mixture composed of 30 parts by weight of isophorone and 70 parts by weight of 3,3,5-trimethyl-cyclohexanone was introduced into the base portion of column 2 and travelled upwardly therein, countercurrently with respect to the condensate. After intimate exchange of material between the two phases, there were obtained, near the hear of extraction column 2, 1082.2 kg of an extract composed of:
   23.9 weight percent of acrylic acid,
   1.5 weight percent of acetic acid,
   1.6 weight percent of high boilers,
   7.7 weight percent of water,
   0.1 weight percent of hydroquinone,
the balance being extractant.

The extract so produced was supplied to first distilling column 6, which was operated under a pressure of 50 mm Hg and in which the extract was freed from acetic acid and water. Column 6 was subdivided into an expulsion zone 1.2 meter high and a reflux intensifier zone likewise 1.2 meter high, which were both packed with stainless steel spirals (6 mm). The head product obtained at a head temperature of 42° C consisted of 103.3 kg of a distillate composed of:
   15.4 weight percent of acetic acid,
   2.4 weight percent of acrylic acid,
   0.3 weight percent of extractant,
the balance being water.
   978.9 kg of a base product composed of:
   26.2 weight percent of acrylic acid,
      0.03 weight percent of acetic acid, 1.9 weight percent of high boilers,
      0.03 weight percent of water,
the balance being extractant, was discharged through the bottom of column 6.

The base product of column 6 was introduced into second packed column 9, which was operated under a pressure of 50 mm Hg, and 255.2 kg acrylic acid were obtained therein as the distillate. This acid, termed pure acrylic acid, contained 0.1 weight percent of hydroquinone, 0.1 weight percent of acetic acid, 0.1 weight percent of water and 0.2 weight percent of extractant. The base product of column 9 was supplied to a thin film evaporator and freed therein from 21.2 kg of high boilers, whereas the distillate was recycled to extraction column 2.

The aqueous raffinate coming from extraction column 2, which was obtained at the rate of 491.8 kg and contained minor proportions of acetic acid, formaldehyde and high boilers together with 1.1 weight percent of extractant, was introduced into stripping column 15, wherein the extractant was stripped off and recovered. Column 15 was packed with Raschig rings (6 mm) and operated at atmospheric pressure. The extractant recovered therein was combined with 0.8 kg of fresh extractant flowing through conduit 3, and the extractant combination was used again in extraction column 2.

486.5 kg of waste water composed of:
   0.1 weight percent of acrylic acid,
   0.1 weight percent of acetic acid,
   1.6 weight percent of formaldehyde,
   0.1 weight percent of high boilers, the balance being water, was discharged through the bottom of stripping column 15.

97.9 percent of the crude acrylic acid used were recovered as pure acrylic acid. The balance to 100 was found to have been transformed into high-boiling polymers and was lost together with the waste water, and in column 6 together with acetic acid.

We claim:

1. A process for isolating pure acrylic acid from an aqueous crude acid containing acrylic acid together with minor proportions of acetic acid, formaldehyde and high boilers boiling at a temperature higher than 220° C, by liquid-liquid extraction with the use of 3,3,5-trimethylcyclohexanone, isophorone or mixtures thereof as an extractant, which comprises subjecting the aqueous acrylic acid-containing crude acid in an extraction zone to counterflow extraction with the use of the extractant and with the resultant formation of an organic extract containing acrylic acid, acetic acid, high boilers and minor proportions of water dissolved in the extractant; introducing the extract approximately into the midsection of a first distilling zone; removing acetic acid and water overhead under reduced pressure; delivering the base product of the first distilling zone, containing extractant, acrylic acid and high boilers, approximately to the midsection of a second distilling zone; distilling off pure acrylic acid overhead under reduced pressure; and recycling the base product of the second distilling zone consisting of high boilers and extractant, to the extraction zone.

2. The process as claimed in claim 1, wherein a portion of the base product of the second distilling zone, consisting of high boilers and extractant, is removed from the said second distilling zone, distilled and the extractant distillatively freed from the high boilers is recycled to the extraction zone.

3. The process as claimed in claim 1, wherein aqueous raffinate, which is obtained in the extraction zone and contains dissolved extractant, is delivered approximately to the midsection of a stripping zone, the extractant is recovered by removing an azeotrope of extractant and water overhead, the azeotrope is recycled to the extraction zone, and waste water is discharged through the base of the stripping zone.

4. The process as claimed in claim 1, wherein the first and second distilling zones are operated under a pressure of between 5 and 200 mm Hg.

5. The process as claimed in claim 1, wherein the aqueous crude acid contains between 5 and 40 weight percent acrylic acid, between 0.5 and 8 weight percent acetic acid, between 0.5 and 5 weight percent formaldehyde and between 0.2 and 5 weight percent high boilers.

6. The process as claimed in claim 1, wherein the aqueous crude acid is extracted with the use of between one and 10 parts by weight extractant, per part by weight acrylic acid in the aqueous crude acid.

* * * * *